June 2, 1964 — A. H. FORTIER — 3,135,939
STATIONARY INDUCTION APPARATUS
Filed May 8, 1961 — 2 Sheets-Sheet 1
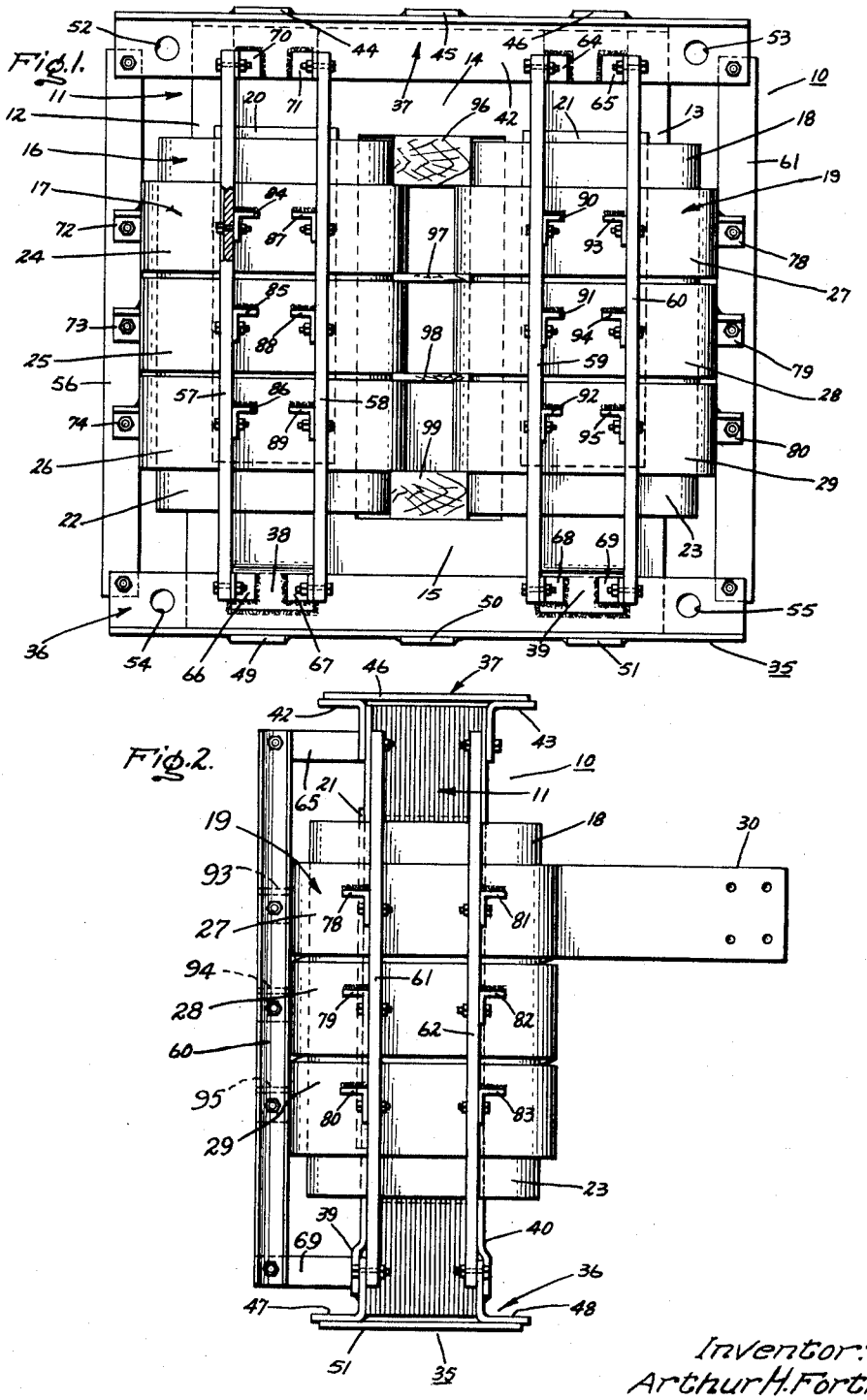
Inventor:
Arthur H. Fortier,
by Henry J. Maraniak
Attorney.

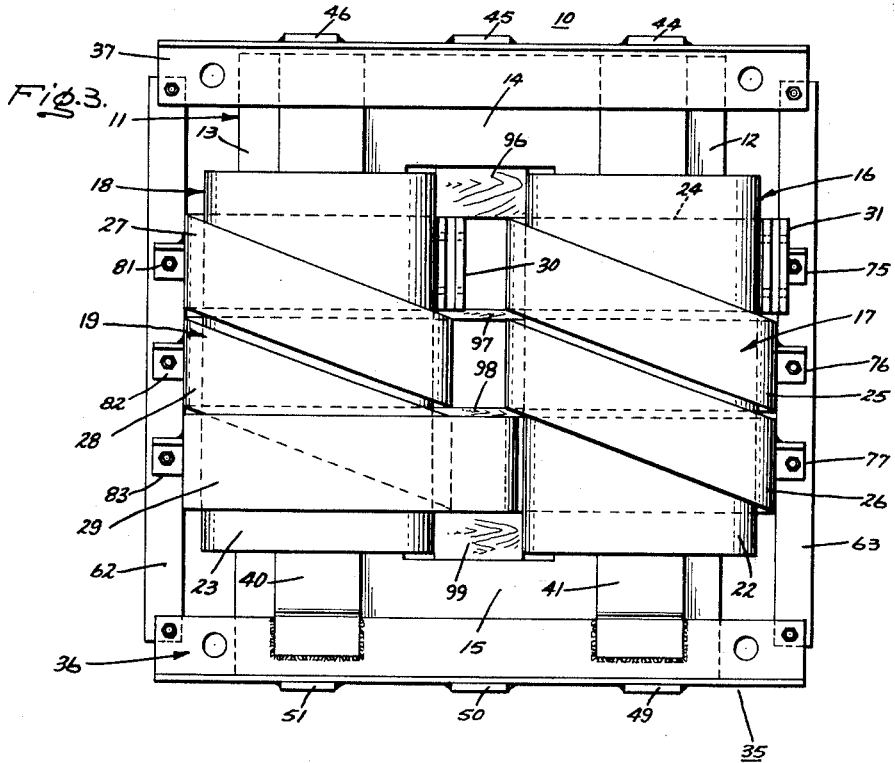

United States Patent Office 3,135,939
Patented June 2, 1964

3,135,939
STATIONARY INDUCTION APPARATUS
Arthur H. Fortier, Fort Wayne, Ind., assignor to General Electric Company, a corporation of New York
Filed May 8, 1961, Ser. No. 108,519
7 Claims. (Cl. 336—199)

This invention relates to stationary electrical induction apparatus. More particularly it relates to an electrical induction apparatus having an improved means for supporting and positioning one or more electrical coils on a winding leg section of the magnetic core.

In conventional constructions of stationary induction apparatus, as for example power transformers, the cores are generally comprised of one or more winding leg sections on which an electrical coil or coils are mounted. The coils are usually supported and positioned by a suitable wedging means. The magnetic cores are formed of stacked laminations of magnetic material held in assembled relation by frame members which are disposed along the magnetic core and provide support for the apparatus.

To prevent the winding of an electrical coil from short circuiting, it is required that coils be supported in a fixed position with respect to the core winding leg section. Movement of the coil under stresses incident to short circuit or transient conditions must be effectively restrained so that the electrical coil does not come in contact with the frame members or the magnetic core and cause the coil to become grounded. Further, such movement of the coil must be restrained to prevent the stresses from causing damage to the coil.

Heretofore, electrical coils have been supported in position on the winding leg sections of the magnetic core by means of wood blocks wedged between the coils and between the coil and other parts of the apparatus. A principal disadvantage of this arrangement is that it requires assembly techniques that are costly from a time and labor standpoint. Moreover, such a prior art arrangement was not entirely satisfactory in high current applications since wedges did not adequately protect the electrical coils from the stresses resulting from short circuit or transient conditions in the electrical coil circuit. It is, therefore, desirable that an improved means be provided in electrical induction apparatus for simplifying the assembly operation of such apparatus and for adequately supporting and positioning the coils so that effects of stresses within the coil can be minimized.

Accordingly, it is an object of the invention to provide a new and improved support and positioning arrangement for electrical coils of stationary induction apparatus.

Another object of the invention is to provide a new and improved support and positioning arrangement for electrical coils wherein the electrical coils are maintained in a predetermined axial position on the winding leg section of the magnetic core.

It is another object of the invention to provide a new and improved support and positioning arrangement for electrical coils wherein the effects of short circuit stresses in the coil is effectively minimized.

A further object of the invention is to provide an improved support and positioning arrangement wherein an electrical coil can be readily and economically mounted in fixed position on the winding leg section of the magnetic core of the electrical induction apparatus.

In carrying out the invention in one form thereof, I have provided a transformer having a laminated core which includes at least a pair of winding leg sections and top and bottom yokes connecting the winding leg sections. The magnetic core is supported in a rigid frame which includes a base frame member and an upper frame member for supporting the magnetic core. Electrical coils are disposed on the winding leg sections. According to the invention at least one coil frame member is disposed adjacent to one of the coils and secured thereto. This coil frame member is fixedly secured to the base frame member and upper member so that the coil is maintained in position with respect to the magnetic core. The coil frame member is comprised of insulating material and thereby forms an insulated support connecting the electrical coil in rigid relationship with the upper frame member and the lower frame member to which it is attached.

The subject matter of the invention is particularly pointed out and distinctly claimed in the concluding portion of this specification. The invention however, both as to organization and advantages may best be understood by referring to the following description taken in conjunction with the accompanying drawings in which:

FIG. 1 is a front elevation view of an improved transformer embodying one form of the invention;

FIG. 2 is a side elevation view of the transformer shown in FIG. 1;

FIG. 3 is a rear elevation view of the transformer illustrated in FIG. 1; and

FIG. 4 is a perspective view of a portion of the electrical coil employed in the transformer shown in FIG. 1.

Referring now to the drawings and specifically to FIGS. 1, 2 and 3, the power transformer 10 shown therein includes a magnetic core 11, two vertically extending winding leg sections 12, 13, a top yoke 14 and bottom yoke 15 which are connected with the winding leg sections 12, 13 to form a closed magnetic circuit. The transformer 10 is a dry-type transformer suitable for operation without insulating oil. The magnetic core 11 is formed of a stack of U-shaped and I-shaped laminations of magnetic material which are inverted in alternate layers so that the joints between the laminations overlap. Winding leg section 12 has mounted thereon an inner high voltage coil 16. An outer low voltage coil 17 is coaxially mounted about the inner coil 16. Similarly, an inner high voltage coil 18 is mounted on winding leg section 13, and an outer low voltage coil 19 is disposed coaxially about the inner coil 18.

As is best seen in FIG. 1, the high voltage coils 16, 18 are secured to winding leg sections 12, 13, respectively, by wedges 20, 21 which are inserted between the under side of the inner coils 16, 18 and the winding leg sections 12, 13. The inner low voltage coils 16, 18 are conventionally constructed and includes a relatively large number of turns as compared with the outer coils 17, 19. The turns of the inner coil are wound on a spool (not shown), and the wedges 20, 21 are interposed between the spools of the inner coils 16, 18 and winding leg sections 12, 13. Insulating wrappers 22, 23 are provided on the outside of the inner coils 16, 18 to protect and insulate the coil windings.

The outer low voltage coil 17 is comprised of three turns 24, 25, 26 formed of relatively wide aluminum bars. Outer low voltage coil 19 is also formed of three coil turns 27, 28, 29. The arrangement of the coil turns 24, 25, 26 of coil 17 is shown in the perspective view of the winding illustrated in FIG. 4. A connector 31 is shown welded to turn 24 in order to provide a suitable means for making an external connection to the coil 17. As is shown in FIG. 3, a connector 30 is provided so that an external connection may be made to outer coil 19. It will be noted that turn 29 of outer coil 19 is connected in circuit with turn 26 thereby placing the outer low voltage coils 17, 19 in series circuit relation.

From the foregoing description it will be apparent that the low voltage coils 17, 19 are designed for supplying a load having a high current requirement such as, for example, a resistance furnace. Although as shown in the illustrative embodiment of the invention the outer low voltage coils 17, 19 are not provided with insulation, it will be appreciated that in some applications it may be desirable to insulate the coils.

In order to provide a support for the magnetic core 11, a main frame assembly 35 is provided which includes a base frame member 36, an upper frame member 37 and the tie plates or vertical straps 38, 39, 40, 41 which are disposed along each side of the winding leg sections 12, 13. As is best seen in FIG. 1, the front pair of tie plates or vertical straps 38, 39 are attached to the upper and base frame members 36, 37 by welding.

In the view shown in FIG. 3, it will be seen that the rear pair of tie plates 40, 41 are similarly connected to the upper and base frame members 36, 37. The upper frame member 37 is fabricated by a pair of angle iron sections 42, 43. The angle iron sections 42, 43 are rigidly joined together by cross plates 44, 45, 46 so that a clamping action is exerted against the laminations of the magnetic core 11 thereby holding the laminations in assembled relation. The cross plates 44, 45, 46 are welded to the angle iron sections 42, 43 or may be attached thereto by other suitable means. Base or lower frame member 36 disposed along the bottom yokes 15 is of similar construction and includes a pair of angle iron sections 47, 48 which are joined by cross plates 49, 50, 51 to exert a clamping action against the lower yoke 15 of the magnetic core 11. In order to facilitate lifting of the transformer 10, openings 52, 53, 54, 55 in the frame members 36, 37 may be provided.

The coil positioning and support arrangement of the invention includes a plurality of vertically extending channel-shaped coil members 56, 57, 58, 59, 60, 61, 62, 63 and horizontal frame extension members 64, 65, 66, 67, 68, 69, 70, 71. As shown in FIG. 4, the outer coil 17 is rigidly secured at one side thereof to coil frame members 56, 63 by brackets 72, 73, 74, 75, 76, 77, which are welded to the outer coil 17 and bolted to the frame members 56, 63. In a similar manner, outer coil 19, as shown in the side elevation view of the transformer 10 illustrated in FIG. 2, is fixedly secured to coil frame members 61, 62 by brackets 78, 79, 80, 81, 82, 83.

Referring now to FIGS. 1 and 4, it will be seen that outer coil 17 is rigidly supported at the front side thereof by coil frame members 57, 58 which are attached at the ends thereof to frame extension members 70, 71, 66, 67. Brackets 84, 85, 86, 87, 88, 89 welded to outer coil 17 serve as a securing means. A similar arrangement is employed for outer coil 19. Thus, the vertically extending coil frame members 59, 60 are attached at the ends thereof to frame extension members 64, 65, 68, 69. The individual turns 27, 28, 29 of outer coil 19 are fixedly attached to the coil frame members 59, 60 by means of brackets 90, 91, 92, 93, 94, 95 which are welded to the outer coil 19.

To provide additional support for the outer coils 17, 19 and to maintain the spacing between the coil turns, suitable spacers 96, 97, 98, 99 may be inserted between the magnetic core 11 and the coil turns 24, 25, 26, 27, 28, 29 as shown in FIG. 1. Preferably, the spacers 96, 97, 98, 99 are made of wood or other insulating material.

The frame members 56, 57, 58, 59, 60, 61, 62, 63 were fabricated of a polyester resin reinforced with glass fibers to provide increased mechanical strength. Any suitable insulating material possessing sufficient mechanical strength to support the coils and resist the stresses developed within the coils may be employed in the practice of the invention. Thus, in accordance with the invention the coil frame members not only support a coil in predetermined position with respect to the magnetic core but insulate the coil from the main frame to which they are attached.

From the foregoing description it will be readily apparent that the plurality of insulating coil frame members disposed at the front and sides of the outer coils not only position a coil so that the individual coil turns are spaced in a vertical direction but are also positioned so that stresses caused by short circuit or transient conditions in the coil circuit are effectively minimized. The coil frame members rigidly support the coils, and any sidewise movement of the coil turns which might cause the coils to become grounded is restrained.

Considering all of the above, it will be seen that a new and improved stationary induction apparatus is provided in which the coils are securely held in place with respect to a magnetic core. The substantially rigid frame formed by the vertically extending coil frame members is effective to restrain movement of the coils resulting from short circuit stresses. It will be appreciated that stresses caused during lifting of the apparatus are borne by the main frame of the transformer and are not transmitted to the coil frame members. The coil supporting and positioning arrangement of the invention makes it possible to readily mount an electrical coil concentrically about an inner coil. The arrangement of the present invention also makes it possible to design the coil frame members to withstand unusual stresses which may be encountered in high current coils.

It will be apparent to those skilled in the art that various changes and modifications may be made to the particular embodiment of the invention which I have described herein without departing from the principle of the invention. For example, many modifications may be made to the structural configuration of the coil frame members and to the means for attaching the coils thereto. It is to be understood, therefore, that I intend by the appended claims to cover all such changes and modifications that fall within the true spirit and scope of the invention.

What I claim as new and desire to secure by Letters Patent of the United States is:

1. In a stationary induction apparatus, a laminated magnetic core including a plurality of vertically extending legs, a top yoke and bottom yoke connecting said legs, at least one electrical coil disposed on one of said legs, a main frame including a base frame member, an upper frame member and a pair of vertical straps connecting said base frame member and upper frame member to provide support for said magnetic core, at least one vertically extending coil frame member disposed at the side of said coil and connected with said upper main frame member and said base frame member, at least one coil frame member disposed at the front of the coil, said electrical coil being rigidly connected to said coil frame members, and said coil frame members being comprised of insulating material and forming an insulated support connecting said coil in rigid relationship with said main frame as to position said electrical coil with respect to the magnetic core.

2. In a stationary induction apparatus, a laminated core including a plurality of vertically extending legs, a top yoke and bottom yoke connecting said legs, electrical coils disposed on said legs, a base frame member disposed at said bottom yoke, an upper frame member disposed at said top yoke, said base frame member and said upper frame member being rigidly associated with said laminated core to provide support for said core, at least one coil frame member disposed at the side of one of said electrical coils and at least one coil frame member disposed at the front thereof, means fixedly securing said coil frame members to said base frame member at their bottom ends and to the upper frame member at their upper ends, said electrical coil being secured to said coil frame members and said coil frame members providing an insulated support connecting said coil with said base member and said upper frame member and fixedly positioning said coil with respect to said magnetic core.

3. In a stationary induction apparatus, a laminated core including a plurality of vertically extending legs, a top yoke and bottom yoke joined with said legs to form a closed magnetic circuit, at least one electrical coil disposed on one of said legs, a vertically extending coil frame member disposed adjacent to the side of the coil and secured thereto, a pair of vertically extending coil frame members disposed at the front of said coil and secured thereto, a lower frame member disposed adjacent to said bottom yoke, an upper frame member disposed adjacent to said top yoke, said upper frame member and said lower frame member being rigidly associated with said laminated core to support and maintain said laminated core in assembled relation, means for attaching said coil frame members in fixed relationship with said upper and lower frame members, said coil frame members providing an insulated support connecting said coil with said upper and lower frame members and fixedly positioning said coil with respect to the magnetic core.

4. In a stationary induction apparatus, a laminated core including at least a pair of winding leg sections, a top yoke and a bottom yoke forming a closed magnetic circuit with said leg sections, an inner electrical coil mounted on one of said leg sections, an outer electrical coil disposed around said inner electrical coil, at least one coil frame member disposed adjacent to said outer electrical coil and secured thereto, an upper frame member disposed along said top yoke, a base frame member disposed along said bottom yoke, said base frame member and said upper frame member maintaining said laminated core in assembled relation and being rigidly associated with said core to provide support therefor, means fixedly securing said coil frame member to said base frame member and to said upper frame member, said coil frame member being comprised of insulating material and thereby providing an insulated support connecting said outer coil with said base member and said upper frame member and fixedly positioning said coil with respect to said magnetic core.

5. In a stationary induction apparatus, a core member including a plurality of vertically extending legs, a top yoke and a bottom yoke forming a closed magnetic circuit with said legs, at least one inner electrical coil mounted on one of said legs, wedging means disposed between said coil and said one of said legs to securely position said coil thereon, an outer electrical coil coaxially mounted about said inner electrical coil, a vertically extending coil frame member disposed adjacent to the side of said outer coil and secured thereto, a pair of vertically extending coil frame members disposed at another location adjacent to said coil and secured thereto and a lower frame member disposed adjacent to said bottom yoke, an upper frame member disposed adjacent to said top yoke, means connecting said upper frame member and said lower frame member in assembled relation with said laminated core to provide support therefor, means for attaching said coil frame members in fixed relation with said upper and lower frame members, said coil frame members being formed of insulating material and providing an insulated support connecting said coil with said upper and lower members.

6. In a stationary induction apparatus, a magnetic core including at least a pair of winding leg sections, a top yoke and bottom yoke forming a closed magnetic circuit with said winding leg sections, an inner electrical coil disposed on each of said winding legs, wedging means for positioning said inner coils with respect to said winding legs, a main frame including a base frame member, an upper frame member and at least a pair of straps connecting said base frame member and upper frame member to support and maintain said magnetic core in assembled relation, an outer electrical coil disposed coaxially about each of said inner electrical coils, at least one coil frame member disposed at the side of said outer coil and secured thereto, at least one coil frame member secured to the electrical coil disposed at a location spaced from said coil frame member disposed at the side of said outer coil, and means rigidly attaching said coil frame members to said main frame thereby fixedly positioning said coil with respect to said magnetic core, said coil frame members being formed of electrically insulating material and providing an insulated support connecting said coil with said main frame.

7. In a stationary induction apparatus, a laminated core including a pair of outer winding legs, a top yoke and a bottom yoke joined with said outer winding legs to form a closed magnetic circuit, an inner electrical coil disposed on each of said outer legs, a wedging means interposed between each of said inner coils and said winding legs to position said inner coils thereon, an outer electrical coil disposed coaxially about each of said inner coils, a main frame including a base frame member, an upper frame member and a pair of straps connected with said base frame member and said upper frame member to support and maintain said magnetic core in assembled relation, a plurality of coil frame members disposed adjacent to said outer coil and in spaced relation with each other, said coil frame members being secured to said outer electrical coils, means rigidly attaching said coil frame members to said main frame, said coil frame members being comprised of insulating material and providing an insulated support connecting said coil with said main frame and to position said outer electrical coils with respect to said magnetic core.

References Cited in the file of this patent
UNITED STATES PATENTS

| | | |
|---|---|---|
| 1,539,878 | Skinner | June 2, 1925 |
| 3,037,177 | Marsh et al. | May 29, 1962 |